(12) United States Patent
Kwon

(10) Patent No.: US 8,978,192 B2
(45) Date of Patent: Mar. 17, 2015

(54) WIPER BLADE ASSEMBLY STRUCTURE

(75) Inventor: Oh Jong Kwon, Sangju-si (KR)

(73) Assignee: CAP Corporation, Gyeongbuk (KR)

( * ) Notice: Subject to any disclaimer, the term of this patent is extended or adjusted under 35 U.S.C. 154(b) by 0 days.

(21) Appl. No.: 13/244,361

(22) Filed: Sep. 24, 2011

(65) Prior Publication Data

US 2012/0159733 A1    Jun. 28, 2012

(30) Foreign Application Priority Data

Dec. 22, 2010    (KR) .................... 10-2010-0132623

(51) Int. Cl.
  *B60S 1/38*    (2006.01)
  *B60S 1/40*    (2006.01)
(52) U.S. Cl.
  CPC ............ *B60S 1/3801* (2013.01); *B60S 1/4003* (2013.01); *B60S 2001/4054* (2013.01); *B60S 2001/409* (2013.01)
  USPC .................................... 15/250.32; 15/250.44

(58) Field of Classification Search
  USPC ............ 15/250.32, 250.43, 250.44, 250.361, 15/250.31, 250.201
  See application file for complete search history.

(56) References Cited

U.S. PATENT DOCUMENTS

| | | | | |
|---|---|---|---|---|
| 3,179,969 | A * | 4/1965 | Glynn ........................ | 15/250.32 |
| 4,118,825 | A * | 10/1978 | Hoebrechts et al. ........ | 15/250.32 |
| 4,324,019 | A * | 4/1982 | Mohnach et al. .......... | 15/250.32 |
| 4,649,591 | A * | 3/1987 | Guerard .................... | 15/250.32 |
| 2009/0199357 | A1* | 8/2009 | Thienard ................... | 15/250.32 |
| 2012/0180245 | A1* | 7/2012 | Ku ............................. | 15/250.32 |

FOREIGN PATENT DOCUMENTS

| | | |
|---|---|---|
| JP | 4038798 B2 | 1/2008 |
| JP | 3157246 U | 1/2010 |
| KR | 10-0999126 B1 | 9/2010 |

* cited by examiner

*Primary Examiner* — Gary Graham
(74) *Attorney, Agent, or Firm* — Revolution IP, PLLC

(57) ABSTRACT

An exemplary embodiment of the present invention includes a wiper blade assembly structure which has a space unit formed in a certain area of a support frame, to which a main arm of the wiper is coupled, and allows a replaceable adaptor to be detachably attached to the space unit to thereby enable various types of main arms to be coupled to a single support frame together with the replaceable adaptor.

7 Claims, 6 Drawing Sheets

WIPER BLADE ASSEMBLY STRUCTURE

RELATED APPLICATIONS

This application claims priority under 35 U.S.C. 119(a) from Korean Patent Application No. 10-2010-0132623, filed Dec. 22, 2010 in the Korean Intellectual Property Office, which is incorporated herein by reference in its entirety.

TECHNICAL FIELD

An exemplary embodiment of the present invention relates to a wiper blade assembly structure, and more particularly, to a wiper blade assembly structure which has a space unit formed in a certain area of a support frame, to which a main arm of a wiper is coupled, and allows a replaceable adaptor to be detachably attached to the space unit to thereby enable various types of main arms to be coupled to a single support frame together with the replaceable adaptor.

BACKGROUND ART

Generally a windshield wiper of an automobile is used to wipe off rain, snow, dirt, or insects from a windshield to ensure a driver's field of vision when it, for example, it rains or snows while driving. The windshield wiper is an essential device for reducing occurrences of car accidents and securing safety of drivers while driving.

The windshield wiper includes a main arm operating by a driving force supplied by a wiper motor, a support frame connected to the main arm and receiving the driving force therefrom and a wiper blade including a coupling groove coupled to the support frame. The wiper blade is positioned against the windshield and operates by the driving force transmitted from the main arm through the support frame to thereby remove, for example, dirt from the windshield.

In the wiper structure above, the wiper blade should operate by being positioned against the windshield to remove, for example, the dirt from the windshield. Accordingly, the main arm and the support frame are coupled to each other with the configuration to apply force so that the wiper blade is positioned against the windshield. Recently, additional devices are mounted in an automobile to increase the force of the wiper blade against the windshield to thereby prevent separation between the wiper blade and the windshield which may arise by air resistance or inertial force while driving.

Such a wiper blade operates by directly contacting the windshield and generally includes a soft rubber to protect the windshield. As above, as the wiper blade is positioned against the windshield, it is worn heavily by friction with the windshield, and is exposed to, for example, snow or rain, and corrosion and cracking may occur easily. Accordingly, a wiper blade should have such structure that a user may easily replace the wiper blade.

In the conventional wiper, the support frame varies depending on the specifications of the wiper main arm coupled to the support frame of the blade assembly structure, which causes inconvenience and unnecessary consumption of materials. That is, if the structure of the main arm varies depending on the type of automobiles, the wiper support frame coupled to the main arm should also be replaced accordingly. This causes inconvenience in use and raises costs due to waste of materials.

The conventional wiper support frame is thick and includes a plastic material and weighs much.

SUMMARY

An aspect of the present invention is to solve the above problems and it is an aspect of the present invention to provide a wiper blade assembly structure which has a space unit formed in a certain area of a support frame, to which a main arm of a wiper is coupled, and allows a replaceable adaptor to be detachably attached to the space unit to thereby enable various types of main arms to be coupled to a single support frame together with the replaceable adaptor.

According to an aspect of the present invention, a wiper blade assembly structure is provided. The wiper blade assembly may comprise a main arm which operates by a driving force supplied by a wiper motor, a support frame which is connected to the main arm and receives the driving force from the main arm and has a space unit formed in a certain size in an upper central part thereof and a lower coupling member formed in the space unit to be coupled to a replaceable adaptor, a replaceable adaptor which is detachably attached to the space unit of the support frame by a fixing means using a fixing pin and couples the main arm to the support frame, a blade fixer which is coupled to a lower part of the support frame, and a blade which is coupled to the blade fixer. The replaceable adaptor includes a coupling part formed in a central part thereof to be detachably coupled to a front end coupling part of the main arm, and a fixing pin inserting hole formed in a lower part thereof, into which the fixing pin of the support frame is inserted. The replaceable adapter is of a size to be inserted into an inside of the space unit of the support frame.

The fixing means may comprise at least one fixing pin to fix the replaceable adaptor in a vertical direction, and a hook member to fix the replaceable adaptor to the space unit of the support frame.

The replaceable adaptor according to an exemplary embodiment of the present invention may have a coupling part formed in a central part thereof to be detachably coupled to a front end coupling part of the main arm, and an upper coupling member corresponding to the lower coupling member formed in a lower side thereof, and may have a size to be inserted into the inside of the space unit of the support frame.

The lower coupling member of the support frame may comprise at least one fixing pin to fie the replaceable adaptor in a vertical direction and a hook member which fixes the replaceable adaptor to the space unit of the support frame.

The replaceable adaptor according to an exemplary embodiment of the present invention may be replaced by other types of replaceable adaptors to be coupled to each main arm, depending on the type of the main arm.

An insert reinforcing frame may be installed in an internal lower side of the part where the replaceable adaptor of the support frame is installed and reinforces the strength of the support frame.

The insert reinforcing frame may comprise a steel material, and may be formed in a longer length than the space unit of the support frame.

As described above, a wiper blade assembly according to an exemplary embodiment of the present invention maintains consistent strength, and at the same time, connects various types of wiper main arms to a single blade assembly to thereby improve utilization and saves manufacturing costs since the wiper blade assembly does not need to vary depending on the type of the wiper main arm.

The foregoing and other aspects will become apparent from the following detailed description when considered in conjunction with the accompanying drawing figures.

DETAILED DESCRIPTION

Figure 1:
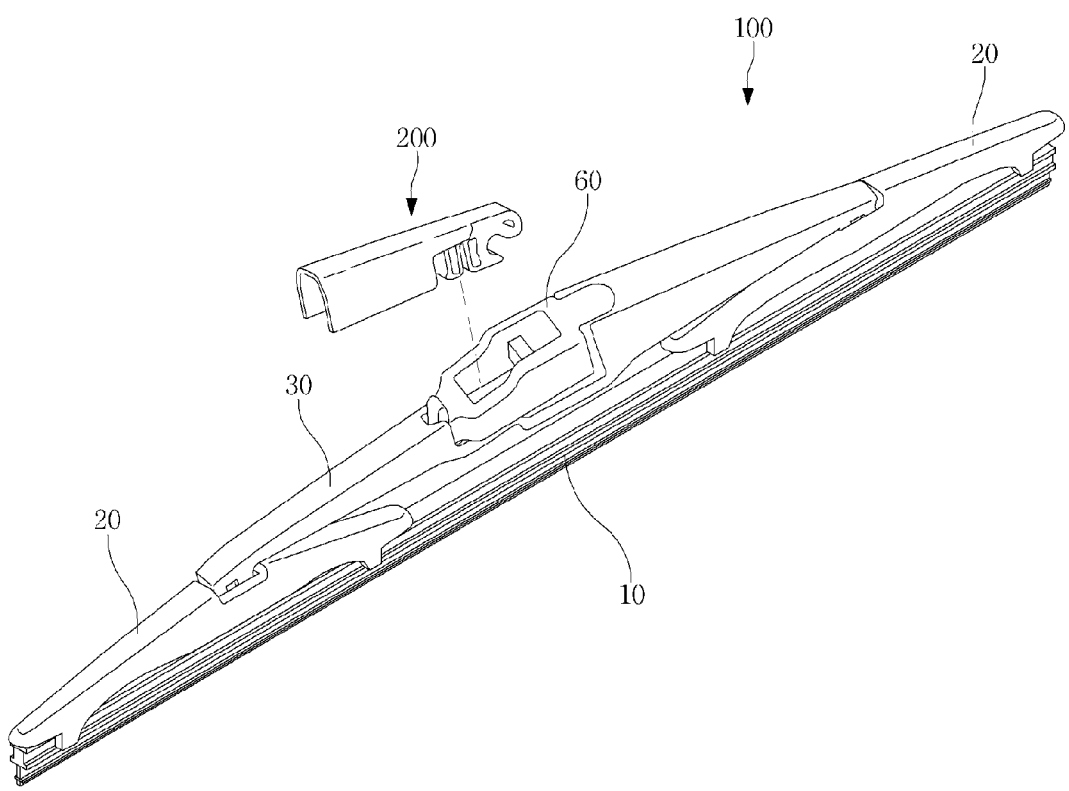
FIG. 1 is a perspective view of a wiper blade assembly and a front end part of a main arm to couple to the wiper blade assembly according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures.

As used in the description of this application, the terms "a", "an" and "the" may refer to one or more than one of an element (e.g., item or act). Similarly, a particular quantity of an element may be described or shown while the actual quantity of the element may differ. The terms "and" and "or" may be used in the conjunctive or disjunctive sense and will generally be understood to be equivalent to "and/or". References to "an" or "one" embodiment are not necessarily all referring to the same embodiment. Elements from an embodiment may be combined with elements of another. No element used in the description of this application should be construed as critical or essential to the invention unless explicitly described as such. Further, when an element is described as "connected," "coupled," or otherwise linked to another element, it may be directly linked to the other element, or intervening elements may be present.

Figure 2A:
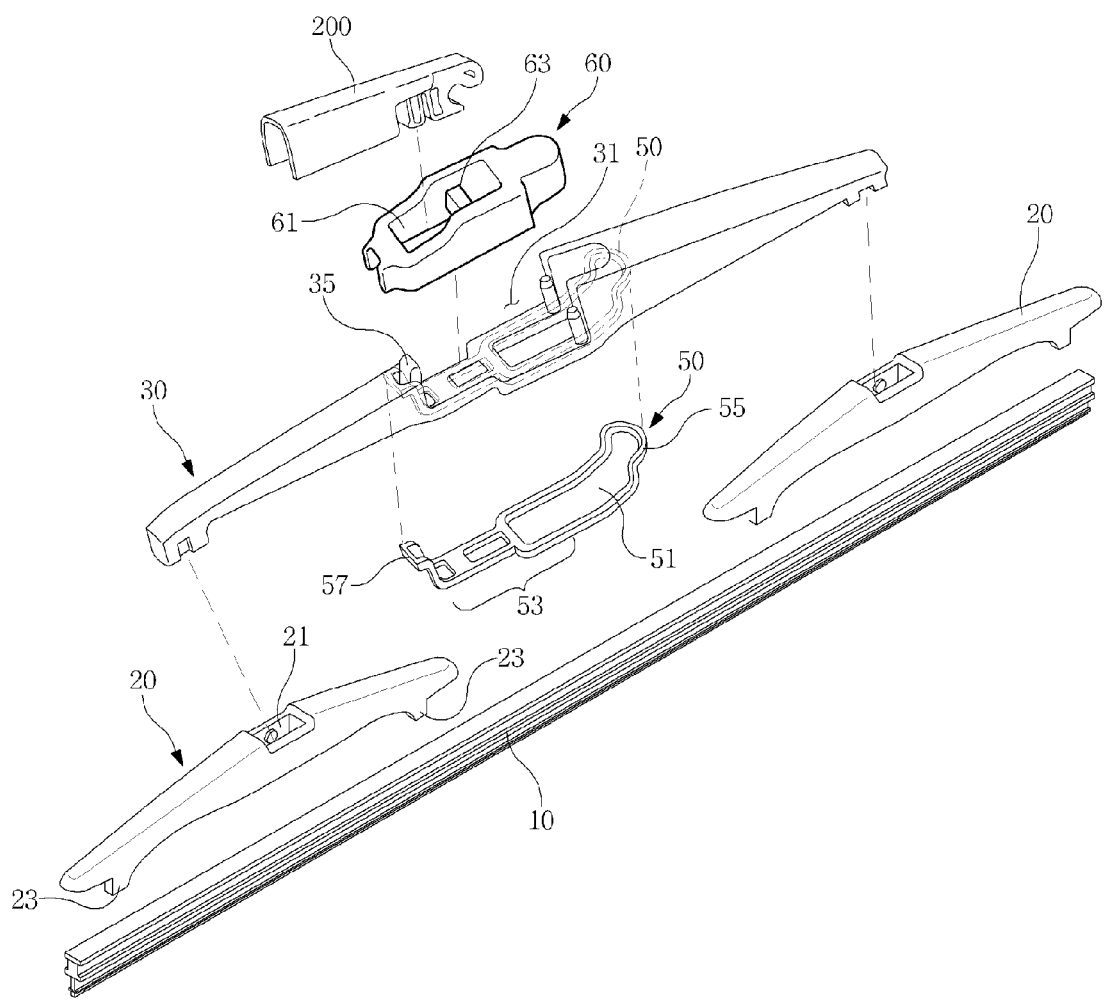
FIG. 2A is an exploded perspective view of the wiper blade assembly and the main arm in FIG. 1.
Figure 2B:
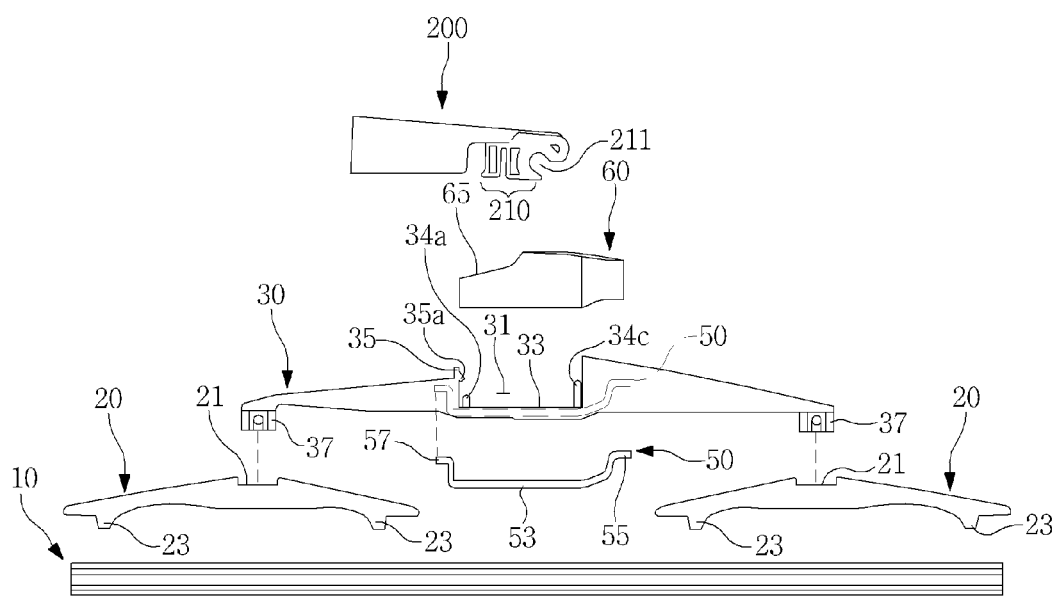
FIG. 2B is a front view of the wiper blade assembly and the main arm in FIG. 1.

FIG. 1 is a perspective view of a wiper blade assembly and a front end part of a main arm to couple to the wiper blade assembly according to an exemplary embodiment of the present invention. FIG. 2A is an exploded perspective view of the wiper blade assembly and the main arm in FIG. 1. FIG. 2B is a front view of the wiper blade assembly and the main arm in FIG. 2A.

Figure 3:
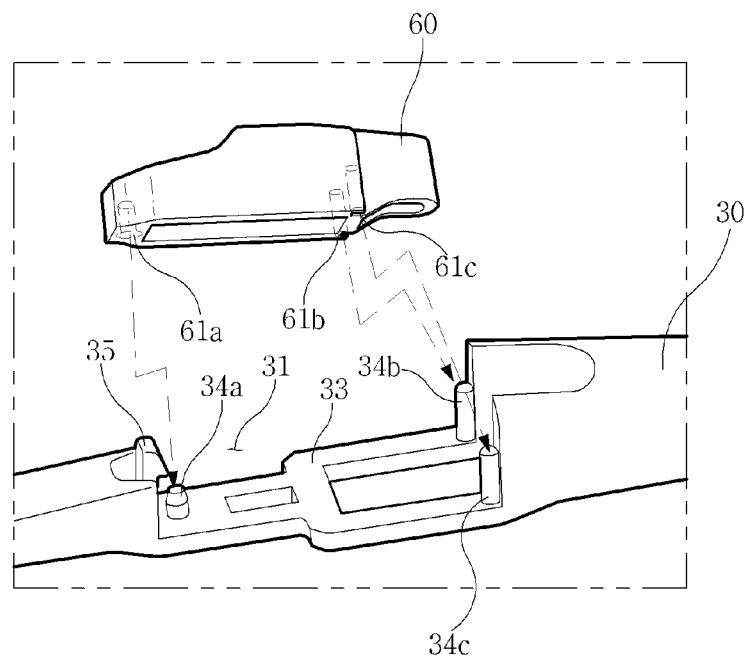
FIG. 3 is an enlarged perspective view of a replaceable adaptor to couple to a space unit of a support frame according to an exemplary embodiment of the present invention.

FIG. 3 is an enlarged perspective view of a replaceable adaptor to couple to a space unit of a support frame according to an exemplary embodiment of the present invention.

Referring to FIGS. 1 to 3, the wiper blade assembly structure according to an exemplary embodiment of the present invention may include a blade assembly 100 that may have a wiper blade 10 attached to a lower part thereof and a replaceable adaptor 60 coupled to an upper part thereof; and a main arm 200 whose front end coupling part may couple to the replaceable adaptor 60 of the blade assembly 100.

With the foregoing configuration, the main arm 200 of the wiper may operate by the driving force directly supplied by a wiper motor (not shown). The wiper blade assembly 100 may include a support frame 30 which may be connected to the main arm 200 to receive the driving force therefrom, may have a space unit 31 (refer to FIG. 2A) formed in a certain size in an upper central part thereof and a lower coupling member formed in a lower surface thereof to be coupled to a replaceable adaptor 60; the replaceable adaptor 60 which may be detachably attached to the space unit 31 of the support frame 30 by a fixing means and couple the main arm 200 to the support frame 30; a blade fixer 20 which may be coupled to a lower part of the support frame 30 and a blade 10 which may be coupled to the blade fixer 20.

The support frame 30 according to an exemplary embodiment of the present invention may have the space unit 31 formed in a certain area of the upper part, e.g., in a central part thereof in a certain size, and the replaceable adaptor 60 may be detachably attached to the space unit 31.

As a certain part of the support frame 30 may be cut off to form the space unit 31 in the support frame 30, the weight of the support frame 30 may be reduced in proportion to the cut-off area.

However, in inverse proportion to the reduced weight of the support frame 30, the strength of the support frame 30 may be weaker and an insert reinforcing frame may additionally be installed in an internal lower part of the support frame 30. The insert reinforcing frame 50 may include a thin steel material, which may reinforce the strength of the support frame 30 by using the thin strong steel while the thickness of the support frame 30 may be thin.

Accordingly, at the time of injection molding, the insert reinforcing frame 50 may be molded while being inserted into the support frame 30. The insert reinforcing frame 50 may be provided in a lower part of an insertion space unit 31 into which the replaceable adaptor 60 may be inserted, on the support frame, and may be formed in a longer length than the space unit 31 to thereby reinforce the strength of the support frame 30.

In consideration of the foregoing, the insert reinforcing frame 50 may have the space unit 51 formed in a certain part thereof, and a certain length of a central part 53 may be flat to have the same configuration as that of the support frame 30, and opposite ends 55 and 57 that may be bent and project upwardly compared to the central part 53 as shown in FIG. 2A.

The replaceable adaptor 60 may have a coupling part formed in a central part thereof to be detachably coupled to a front end coupling part of the main arm, and an upper coupling member corresponding to the lower coupling member formed in a lower side thereof, and may have a size to be inserted into the inside of the space unit of the support frame.

As shown in FIGS. 2B and 3, the lower coupling member of the support frame 30 may include at least one of fixing pins 34a, 34b and 34c to fit and fix the replaceable adaptor 60 in a vertical direction and a hook member 35 to fix the replaceable adaptor 60 to the support frame 30 concurrently with the replaceable adaptor 60 downwardly inserted into the space unit 31 of the support frame 30.

The lower coupling member of the support frame 30 may be formed as a coupling member in a different type from the fixing pins 34a, 34b and 34c in one side wall of the space unit 31 of the support frame 30. The upper and lower coupling members may be formed to be vertically engaged with each other unlike the foregoing configuration.

Figure 4A:
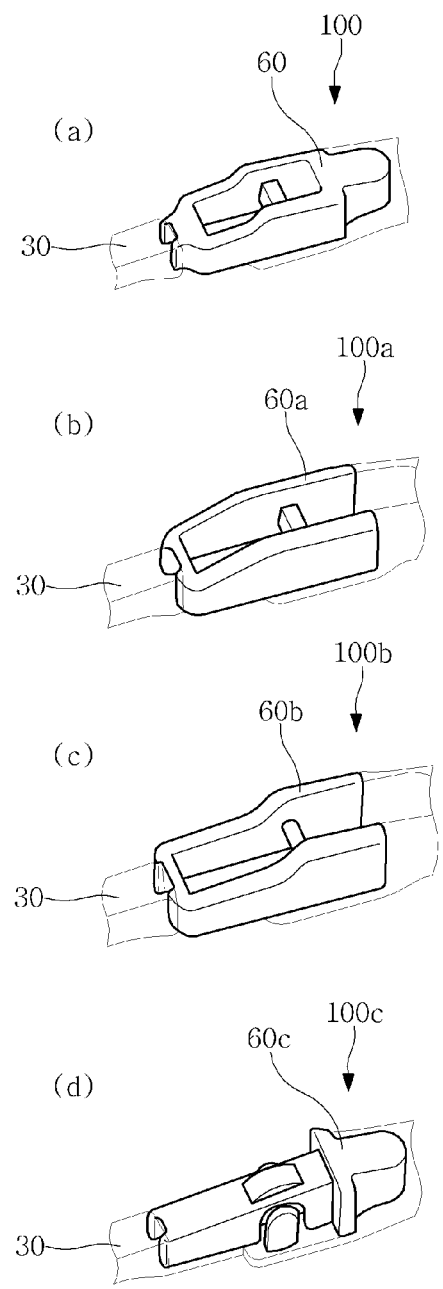
FIG. 4A is a perspective view of various types of replaceable adaptors coupled to the space unit of the support frame according to an exemplary embodiment of the present invention.
Figure 4B:
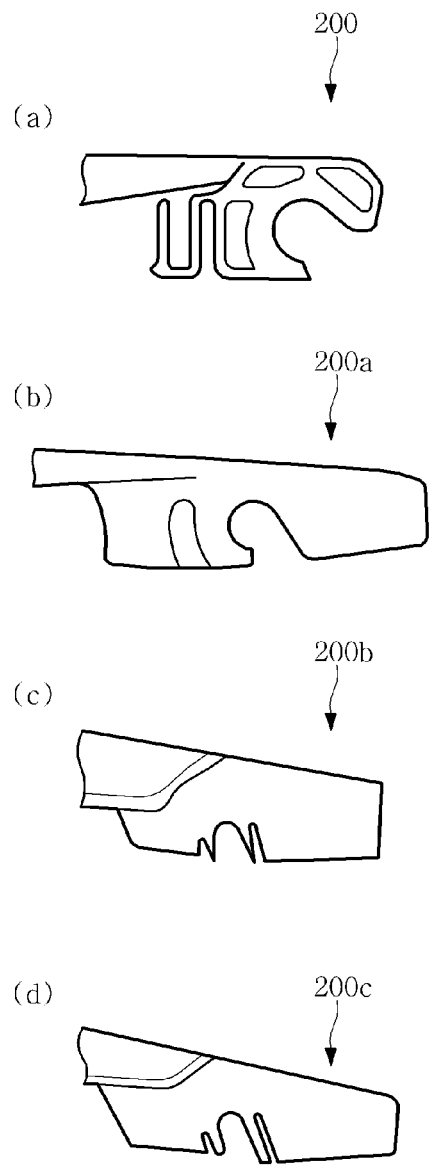
FIG. 4B is a perspective view of a front end structure of the main arm coupled to each replaceable adaptor in FIG. 4A.

Accordingly, the replaceable adaptor 60 according to an exemplary embodiment of the present invention may be replaced by other types of replaceable adaptors (refer to FIG. 4A) to be coupled to each main arm, depending on the type of the main arm (refer to FIG. 4B).

The fixing pins 34a, 34b and 34c formed as an example of the lower coupling member in the support frame 30 may be inserted into insertion grooves 61a, 61b and 61c formed in a lower side of the replaceable adaptor 60.

The hook member 35 may have an inclination surface 35a (refer to FIG. 2B) formed in an upper part thereof, and may be pushed back when the replaceable adaptor 60 moves downward, and projects forward concurrently with the completion of the insertion of the replaceable adaptor 60 to thereby fix the replaceable adaptor 60 inserted into the space unit 31 of the support frame 30.

To detach the replaceable adaptor 60 from the space unit 31 of the support frame 30, the hook member 35 may be pulled back and the replaceable adaptor 60 may be held upward. Then, the replaceable adaptor 60 may be detached from the support frame 30.

The fixing means of the replaceable adaptor 60 may have a different configuration from that described above. Not only the replaceable adaptor 60 with the foregoing configuration, but also other shapes of replaceable adaptors with different configurations may be coupled to the support frame 30. That is, if a coupling means is formed in a lower part of the replaceable adaptor with the different configuration corresponding to the fixing means of the replaceable adaptor according to the present exemplary embodiment, the replaceable adaptor may be coupled to the support frame 30.

Accordingly, the space unit 31 of the support frame 30 according to an exemplary embodiment of the present invention has a configuration to accommodate various types of replaceable adaptors, e.g., replaceable adaptors 60a, 60b and 60c as shown in FIG. 4A, in addition to the replaceable adaptor 60 according to the present exemplary embodiment.

The blade fixer 20 according to an exemplary embodiment the present invention may have the blade 10 attached to a lower part thereof. A conventional normal blade fixer having the blade 10 mounted in a lower part thereof may be applicable and thus detailed description will be omitted in the interest of brevity.

The replaceable adaptor 60 according to an exemplary embodiment of the present invention may have a coupling part 61 formed in a central part thereof to be detachably coupled to a front end part of the main arm 20, and may have fixing pin inserting holes 61a, 61b and 61c (refer to FIG. 3), formed in a lower part thereof, into which the fixing pins 34a, 34b and 34c of the support frame 30 may be inserted and having a size to be inserted into the inside of the space unit 31 of the support frame 30.

In the case of coupling with the main arm 20 provided in an upper part, a front end coupling part 210 (refer to FIG. 2B) of the main arm 200 may be inserted into the coupling part 61 of the replaceable adaptor 60. For example, a fixing shaft inserting groove 211 of the main arm 200 may be coupled to a fixing shaft 63 (refer to FIG. 2A) provided in the inside of the coupling part 61 of the replaceable adaptor 60, and the fixing shaft inserting groove 211 may be rounded inwardly and may surround the fixing shaft 63 provided in the replaceable adaptor 60.

In the replaceable adaptor 60 according to an exemplary embodiment of the present invention, a hook member coupling part 65 formed in a side of the replaceable adaptor 60 may be coupled to the hook member 35 and may have an appropriate thickness according to the size of the hook member 35.

The shape of the replaceable adaptor 60 according to the present invention is not limited to that according to the present exemplary embodiment, and may vary. Also, the configuration of the front end coupling part 210 of the main arm 200 coupled to the replaceable adaptor 60 may vary accordingly.

The configuration of connecting the main arm 200 to the coupling part 61 provided in the replaceable adaptor 60 according to the present invention may be described in the art, and a detailed description will be omitted in the interest of brevity.

Hereinafter, a process of installing the replaceable adaptor 60 according to an exemplary embodiment of the present invention in the space unit 31 of the support frame 30 will be described with reference to FIGS. 2A, 2B and 3.

As shown in FIGS. 2A, 2B and 3, the replaceable adaptor 60 according to an exemplary embodiment of the present invention may be located in an upper part of the space unit 31 of the support frame 30 to couple the replaceable adaptor 60 to the space unit 31 formed in the support frame 30. The fixing pins 34a, 34b and 34c formed in a lower surface 33 of the space unit 31 of the support frame 30 may be inserted into the fixing pin inserting holes 61a, 61b and 61c provided in the lower part of the replaceable adaptor 60.

When the fixing pins 34a, 34b and 34c are inserted into the inside of the replaceable adaptor 60, the hook member 25 may be pulled back, and may project forward concurrently with the completion of the insertion of the replaceable adaptor 60 and the replaceable adaptor 60 may be locked while being inserted. An upper step (not shown) of the hook member 35 in the above state may be located in the hook member coupling part 65 (refer to FIG. 2B) of the replaceable adaptor 60.

The inclination surface 35a may be formed in an upper part of the hook member 35 and may enable the replaceable adaptor 60 to be easily inserted into the space unit 31 of the support frame 30.

FIGS. 4A and 4B illustrate various types of replaceable adaptors according to exemplary embodiments of the present invention and a configuration of the front end coupling part of the main arm coupled to the coupling part of the replaceable adaptors.

That is, FIG. 4A is a perspective view of the various types of the replaceable adaptors coupled to the space unit of the support frame according to the present invention. FIG. 4B illustrates a configuration of the front end coupling part of the main arm coupled to the replaceable adaptors in FIG. 4A.

As shown therein, the replaceable adaptors 60, 60a, 60b and 60c in FIG. 4A may have different shapes, and may be detachably attached to the same support frame 30. Accordingly, the shape of the front end coupling part of the main arms 200, 200a, 200b and 200c coupled to the replaceable adaptors 60, 60a, 60b and 60c may vary.

As described above, the wiper blade assembly structure according to an exemplary embodiment of the present invention may have the space unit formed in a certain area of the support frame coupled to the main arm of the wiper, and may have the replaceable adaptor detachably attached to the space unit to thereby couple various types of main arms to a single support frame. The wiper blade assembly according to an exemplary embodiment of the present invention connects various types of wiper main arms to a single blade assembly to thereby improve utilization of the wiper and save manufacturing costs.

Although embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A wiper blade assembly structure comprising:
a main arm;
an elongated support frame connected to the main arm, said support frame having a space unit defining a cavity therein and formed in a predetermined size in an upper central part of the support frame, a coupling member is formed in one side of the space unit, the coupling member including fixing pins longitudinally spaced along said frame and a flexible hook member, each of the pins and hook member extending generally parallel to each other from a lower central part of the support frame towards said upper central part, to respective free terminal ends, the hook member having an inclination surface formed in an upper part of the hook member; and a replaceable adaptor including a coupling part comprising vertical grooves configured to detachably couple the space unit of the support frame in a vertical direction using the fixing pins and the inclination surface of the hook member, the replaceable adaptor configured to couple the main arm to the support frame, wherein the main arm is inserted into the space unit of the support frame.

2. The wiper blade assembly structure according to claim 1, wherein an insert reinforcing frame is provided in the lower central part of the space unit where the replaceable adaptor is inserted.

3. The wiper blade assembly structure according to claim 2, wherein the insert reinforcing frame comprises a steel material.

4. The wiper blade assembly structure according to claim 2, wherein the insert reinforcing frame is longer than the space unit to thereby reinforce the strength of the support frame.

5. The wiper blade assembly structure according to claim 1, wherein a blade fixer is coupled to a lower part of the support frame and a blade is coupled to the blade fixer.

6. The wiper blade assembly structure according to claim 1, wherein the replaceable adaptor is configured to be replaceable depending on a different type of the main arm.

7. A wiper blade assembly structure comprising:

a main arm;

an elongated support frame connected to the main arm, said support frame having a space unit defining a cavity therein and formed in a predetermined size in an upper central part of the support frame, a coupling member is formed in one side of the space unit, the coupling member including fixing pins longitudinally spaced along said frame and a flexible hook member, each of the pins and hook member extending generally parallel to each other from a lower central part of the support frame towards said upper central part, to respective free terminal ends, the hook member having an inclination surface formed in an upper part of the hook member; and a replaceable adaptor including a coupling part comprising vertical grooves configured to detachably couple the space unit of the support frame in a vertical direction using the fixing pins and the inclination surface of the hook member, the replaceable adaptor configured to couple the main arm to the support frame, wherein the replaceable adaptor is selectively replaceable to a different type of the replaceable adaptor being configured to be coupled to the main arm.

\* \* \* \* \*